Oct. 3, 1967 SHIGERU SAITO ETAL 3,345,140

PHOTOCHEMICAL REACTOR

Filed July 26, 1965 2 Sheets-Sheet 1

Shigeru Saito,
Tetsuya Watanabe &
Kazuo Noguchi INVENTORS

BY Wenderoth, Lind
and Ponack, Attorneys

Oct. 3, 1967  SHIGERU SAITO ET AL  3,345,140
PHOTOCHEMICAL REACTOR

Filed July 26, 1965  2 Sheets-Sheet 2

Shigeru Saito,
Tetsuya Watanabe and
Kazuo Noguchi
INVENTORS

BY Wenderoth, Lind
and Ponack,
Attorneys

United States Patent Office 3,345,140
Patented Oct. 3, 1967

3,345,140
PHOTOCHEMICAL REACTOR
Shigeru Saito, Tetsuya Watanabe, and Kazuo Noguchi, Nakoso-shi, Japan, assignors to Kureha Kagaku Kogyo Kabushiki Kaisha, Tokyo-to, Japan
Filed July 26, 1965, Ser. No. 474,808
Claims priority, application Japan, July 30, 1964, 39/43,301
2 Claims. (Cl. 23—285)

ABSTRACT OF THE DISCLOSURE

The present invention provides an improved photochlorination apparatus. Within a substantially cylindrical reaction vessel there are provided a plurality of substantially tubular light sources horizontally disposed in shelf-like arrangement and extending through the vessel walls. A plurality of liquid impellers attached to a central shaft are positioned along the shaft and between the light source shelves. These impellers are adapted to impel liquid in a downward direction. Above the light sources are provided a plurality of gas-liquid impellers which impellers are attached to and positioned along the central shaft.

---

The present invention relates to an improvement of the chlorination with activated chlorine of water-insoluble organic high polymers in a state of suspension in water and under irradiation by artificial light and to an apparatus therefor.

Photochlorination of water-insoluble organic high polymers in a state of suspension in water has a serious disadvantage because of low solubility of chlorine in water, low wettability of the polymers by water and their low transmittance of light through the suspension. Consequently, the above mentioned photochlorination has not yet been embodied in practice. For example, when photochlorination of polyethylene in a state of suspension in water is to be carried out in a reaction vessel which is provided with a plurality of light source tubes arranged at the inside periphery of said vessel, stirring blades disposed at the central portion of said vessel, and cooling jacket, a large part of the polyethylene floats on the water surface, whereby the chlorination becomes nonuniform and the reaction requires a long period of time, thus causing impossibility of practical use.

It is an object of the present invention to enforce the contact of chlorine with suspended organic high polymers.

Another object is to obtain good water suspension of organic high polymers without the use of any emulsifier.

According to the present invention, said objects and other objects of this invention have been attained by an apparatus which is provided with a light source protected by glass tubes arranged stepwise in and through reaction vessel and with an agitator composed of impellers which stir the space between respective pairs of adjacent shelves.

According to the present invention, the above mentioned apparatus can be further improved. After various experiments, we have found that the rate of absorption of chlorine in water is increased greatly by a vigorous agitation of the vapour-liquid boundary surface and water interior.

If the water interior only is stirred, the rate of absorption of chlorine in water will decrease to from one-twentieth to one-fortieth, and if the boundary only is agitated, the said absorption rate decreases to from one-third to one-fifth. Accordingly, the chlorination rate of a suspended organic polymer is increased by simultaneous agitation of both the boundary and interior.

According to the present invention, the above mentioned improvement has been practiced by providing further a blade which stirs the vapour-liquid boundary surface and also the upper space of the reaction vessel besides the above-mentioned agitator composed of impellers.

The nature, principle, and details of the invention will be more clearly apparent from the following description with respect to preferred embodiments of the invention, when taken in conjunction with the drawings in which like parts are designated by like reference characters, and in which.

Figure 1:
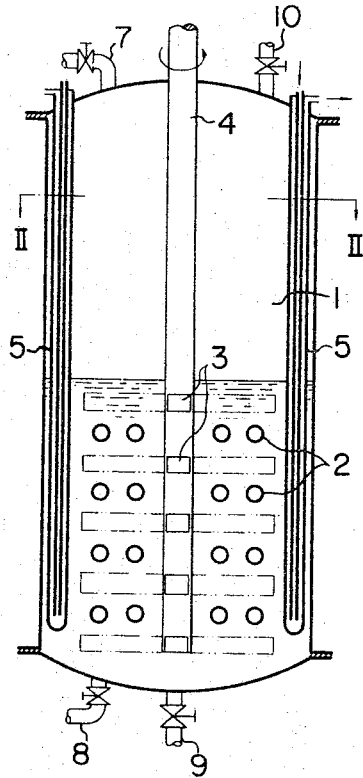
FIG. 1 is an elevational view in vertical section showing the essential construction of an embodiment of apparatus according to the invention.
Figure 2:
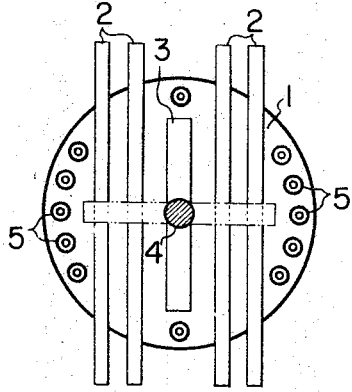
FIG. 2 is a plan view in cross section taken along the plane indicated by line II—II in FIG. 1.

Referring to FIGS. 1 and 2, the apparatus comprises a reaction vessel 1 lined with plastic plate; shelves of glass tubes 2 which pass through the vessel 1 and contain fluorescent lamps therein, respectively; and agitating impellers 3 which are disposed between adjacent pairs of the shelves of the glass tubes, said agitating impellers being hereinafter referred to as "suspension impellers."

The suspension impellers are fixed to a rotating shaft 4 which is rotated in a direction by a driving mechanism, for example, a conventional mechanism consisting of an electric motor and a gearing which are not shown because said mechanism has no direct relation to the characteristic feature of the present invention. The reacation vessel 1 is further provided with a bundle of cooling tubes 5 which are arranged vertically along the inside periphery of the vessel 1, an inlet 7 for a high poylmer to be treated, an inlet 8 for chlorine, an exit 9 for treated high polymer, and an exit 10 for waste gas.

According to the apparatus as described above, since many light source tubes are assembled in compact manner, a large quantity of light energy can be effectively radiated. When the present apparatus is used to chlorinate a suspension of a synthetic resin, speed-up of the chlorination can be made possible, because the light source tubes are close to one another and the particles of synthetic resin are uniformly radiated with light. Furthermore, since uniform agitation can be attained at each layer, concentration of the slurry in the reaction vessel can be made uniform by suitable selection of the form of the impellers, thus enabling very uniform chlorination, and since the light source tubes and the agitating impellers are close to one another, there is no disadvantage such that particles of synthetic resin adheres on the light source tubes, thus decreasing chlorination efficiency.

Figure 6:
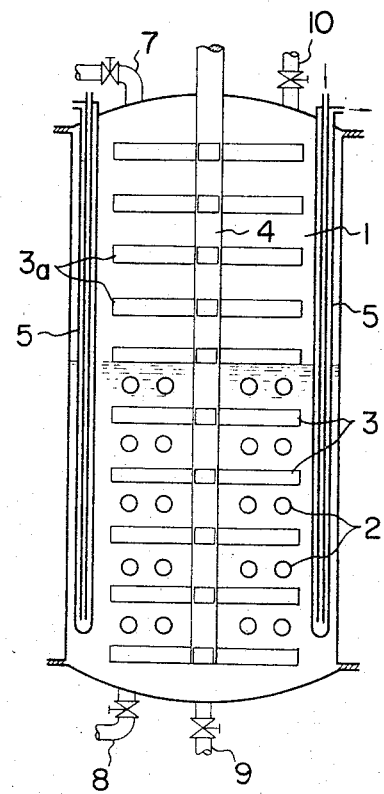
FIG. 6 is an elevational view in vertical section showing a further embodiment of apparatus according to the invention.

In another embodiment of the invention as shown in FIG. 6, in addition to the members from 1 to 10 of the apparatus shown in FIG. 1, a group of horizontal gas-phase agitating impellers 3a which sweep through almost all of the liquid surface and space above the horizontal light-source tubes 2 are additionally installed, said impellers being stepwise fixed to and rotated by the rotating shaft 4. When this group of impellers 3a is thus installed, at least one impeller agitates the surface of the reaction liquid. Consequently, the liquid is vigorously swept up into the gas space, and, furthermore, since the impellers 3a agitating the gas space operate to force the chlorine gas filling the gas space into the liquid, extremely good contacting action between the chlorine gas and the reaction liquid is obtained, whereby the chlorine gas is rapidly absorbed into the reaction liquid. As a result, the chlorination can be further accelerated.

Figure 3:
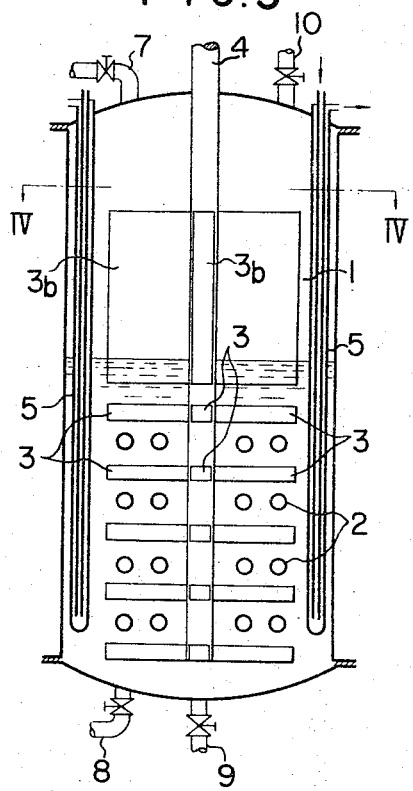
FIG. 3 is an elevational view in vertical section showing another embodiment of the apparatus according to the invention.

The suspension impellers in the apparatuses shown in FIGS. 1 and 3 need not consist of blades within the same vertical planes in all cases, but such an arrangement of vertically alined blades is convenient for installing and removing the impellers.

Figure 4:
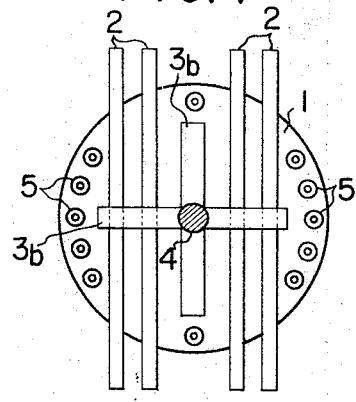
FIG. 4 is a plan view in cross section taken along the plane indicated by line IV—IV in FIG. 3.

The embodiment shown in FIGS. 3 and 4 differs from the embodiment of FIG. 6 in only the agitator which sweeps through almost all of the liquid surface and space above the horizontal light-source tubes 2. In this embodiment of FIGS. 3 and 4, the said agitator is composed of two blades 3b which are crosswisely and vertically fixed to the rotating shaft 4, said stirring blade being hereinafter referred to as "interfacial stirrer."

We have found that the apparatus of FIGS. 3 and 4 can impart much and uniform luminous flux to the suspension, and the interfacial stirrer winds up the suspension, so that particles of polymer even lighter than water, for instance, polyethylene particles accompany with this waterspout and fall into the water, whereupon the suspension impellers carry these particles downward, whereby uniform suspension can be obtained. Furthermore, chlorine gas bubbles are formed when the waterspout washes the upper space of the vessel and also fall into the suspension, whereupon the suspension impellers carry these bubbles downward, whereby a high transfer coefficient is obtained thereby to cause the chlorine to be absorbed rapidly and completely.

The apparatus of the invention is especially effective for the chlorination of water-insoluble polyolefins, for example, polyethylene and polypropylene; polydienes, for example, polybutadiene, polyisoprene, and polychloroprene; polyvinyls, for example, polyvinyl chloride and polystyrene. However, the use of the chlorination apparatus is not limited only the chlorination of polymers but is useful for other organic chlorination reaction, for example, preparation of propylene chlorohydrin, ethylene chlorohydrin.

Figure 5:
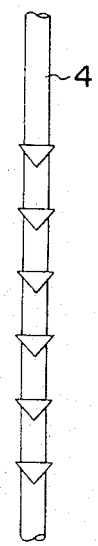
FIG. 5 is a fragmentary view in vertical section showing an example of impellers for suspension agitation according to the invention.

The apparatus illustrated in FIGS. 3 and 4 is put into measuring of rate of absorption of chlorine. In this case, the vessel is lined with plastic plate, its diameter being 1 meter and its height being 2 meters. The interfacial stirrers 3b are set crosswise as shown in FIG. 4, its diameter being 0.7 meter, its width being 0.2 meter, and its lower 0.05 meter being submerged in the water. Its upper 0.15 meter is above the vapour-liquid boundary during operation. Each of the suspension impellers 3 has a cross section which is an inverted triangle as shown in FIG. 5 to carry gas bubbles downward.

We have found that the dissolution rate of chlorine at a temperature of 40° C. and chlorine concentration of 2 grams per liter is 3.02 kilograms per cubic meter per hour. The overall transfer coefficient, KLa[min.$^{-1}$] is shown in Table 1, compared with the case of using only suspension impellers and that of using only the interfacial stirrer. It is apparent that the combination of the suspension impellers and the interfacial stirrer is effective.

In order to indicate still more fully the nature and details of the invention, the following examples of typical practice of the invention are set forth, it being understood that these examples are presented as illustrative only, and that they are not intended to limit the scope of the invention.

*Example 1*

Chlorination of polyethylene of an average particle diameter of 50 microns, specific gravity of 0.915, and mean degree of polymerization of 4,000 was carried out in an apparatus of the construction indicated in FIG. 6.

The reaction vessel had an interior volume of 500 liters and was lined with polyvinyl chloride. Twenty fluorescent lamps, each of 10-watt rating, were installed at five levels, each of four lamps, to form five horizontal fluorescent lamp shelves. Six rows of horizontal suspension impellers, each row consisting of blades with cross-sections in the cross-sectional form of inverted triangles as indicated in FIG. 5, were mounted on the common shaft at levels alternating with those of the fluorescent lamp shelves thereby to accomplish agitation within the spaces between the lamp shelves in a manner to force the polyethylene, of lower specific gravity than water, into the water.

Around the lamps and impellers there were disposed cooling pipes, each consisting of concentric, inner and outer tubes, the inner tube being for inlet of cooling water, and the outer tube being for outlet of the cooling water along the passage between the inner and outer tubes, said cooling pipes being designed to maintain the reaction liquid at the specified temperature.

Above the suspension impellers, there were further provided on the common rotating shaft seven rows of gas impellers, each row consisting of four blades forming a horizontal cross, and each blade consisting of a vertically positioned flat plate.

The resulting rate of chlorine dissolution was 3.02 grams per cubic meter per hour at a reaction temperature of 40 degrees C. and with a chlorine concentration of 2 grams per liter, and the time to attain a degree of chlorination of 35 percent was 25 hours.

*Example 2*

The apparatus illustrated in FIGS. 3 and 4 was used for treating with chlorine polyethylene particles of mean diameter of 50 microns, specific gravity of 0.915, and mean degree of polymerization of 4,000. Twenty fluorescent lamps were divided into 5 shelves, each shelf being composed of 4 lamps. Jacket type cooling tubes 6 arranged inside of the vessel wall were used to hold the reaction temperature at 60° C. We found that the time necessary to obtain chlorinated polyethylene of 35% chlorine content was only 5 hours, while the time was 30 hours when the conventional apparatus comprising a reaction vessel, a plurality of light-source tubes arranged at the inside periphery of said vessel, stirring blades disposed at the central portion of said vessel, and cooling jacket tubes was used under the same conditions.

*Example 3*

The apparatus described in Example 2 was used for treating with chlorine polyvinyl chloride particles of mean diameter of 70 microns, specific gravity of 1.40, and mean degree of polymerization of 1,000. We found

TABLE I

| Overall transfer Coefficient, KLa min.$^{-1}$ | When chlorine is supplied from inlet conduit 8. Mass velocity of chlorine 250 liter/min. | When chlorine is supplied from inlet conduit 8. Mass velocity of chlorine 30 liter/min. | When chlorine is supplied from inlet conduit 8. Consumed chlorine supplied. |
|---|---|---|---|
| Using only suspension impellers | 150×10$^{-3}$ | 17×10$^{-3}$ | 10×10$^{-3}$ |
| Using only interfacial stirrers | 130×10$^{-3}$ | 100×10$^{-3}$ | 90×10$^{-3}$ |
| Using jointly suspension impellers and interfacial stirrers. | 560×10$^{-3}$ | 450×10$^{-3}$ | 440×10$^{-3}$ | that the time necessary to obtain chlorinated polyvinyl chloride of 67% of chlorine content was 8 hours under the same conditions as those of Example 2.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:
1. A photochlorination apparatus which comprises:
   (a) a substantially cylindrical reaction vessel,
   (b) the top of said vessel being provided with means for introducing a substance to be photochlorinated and outlet means for removing gas,
   (c) the bottom of said vessel being provided with means for introducing chlorine gas and means for removing photochlorinated substance,
   (d) the inner periphery of the vessel being provided with vertically arranged cooling tubes,
   (e) a rotatably mounted shaft substantially centrally positioned and extending vertically from substantially the bottom of the vessel through the top of the vessel,
   (f) means for rotating the said shaft,
   (g) a plurality of substantially tubular light sources horizontally disposed in shelf-like arrangement within said vessel and extending through the vessel walls,
   (h) a plurality of impellers attached to and positioned along the shaft between the horizontally disposed light sources and adapted to impel liquid in a downward direction, and
   (i) a plurality of impellers attached to and positioned along the shaft above the said horizontally disposed light sources.

2. A photochlorination apparatus as in claim 1 wherein the liquid impellers have an inverted triangular shape.

References Cited
UNITED STATES PATENTS

| | | | |
|---|---|---|---|
| 1,308,760 | 7/1919 | Lacy | 23—252 |
| 2,499,129 | 2/1950 | Calfee et al. | 204—163 |
| 2,727,884 | 12/1955 | McDonald et al. | 23—285 X |

JOSEPH SCOVRONEK, *Acting Primary Examiner.*

JAMES H. TAYMAN, JR., *Assistant Examiner.*